(12) United States Patent
Heurlin et al.

(10) Patent No.: US 10,688,952 B2
(45) Date of Patent: Jun. 23, 2020

(54) DASHBOARD PROTECTION ARRANGEMENT

(71) Applicant: Volvo Car Corporation, Gothenburg (SE)

(72) Inventors: Fredrik Heurlin, Torslanda (SE); Jonas Gothlin, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 275 days.

(21) Appl. No.: 15/457,038

(22) Filed: Mar. 13, 2017

(65) Prior Publication Data
US 2017/0274859 A1 Sep. 28, 2017

(30) Foreign Application Priority Data

Mar. 24, 2016 (EP) ..................................... 16162237

(51) Int. Cl.
*B60R 21/205* (2011.01)
*B60R 21/231* (2011.01)
*B60R 21/2338* (2011.01)
*B60R 21/235* (2006.01)
*B60R 21/203* (2006.01)

(52) U.S. Cl.
CPC .......... *B60R 21/205* (2013.01); *B60R 21/231* (2013.01); *B60R 21/235* (2013.01); *B60R 21/2338* (2013.01); *B60R 21/203* (2013.01); *B60R 2021/23107* (2013.01); *B60R 2021/23382* (2013.01); *B60R 2021/23386* (2013.01); *B60R 2021/23514* (2013.01)

(58) Field of Classification Search
CPC . B60R 21/205; B60R 21/2338; B60R 21/235; B60R 21/231; B60R 2021/23514; B60R 21/203; B60R 2021/23107; B60R 2021/23382; B60R 2021/23386
See application file for complete search history.

(56) References Cited

U.S. PATENT DOCUMENTS 5,575,497 A * 11/1996 Suyama ................. B60R 21/231
280/730.1
6,607,210 B2 * 8/2003 Eckert ................... B60R 21/233
280/732

(Continued)

FOREIGN PATENT DOCUMENTS

| CN | 101376379 A | 3/2009 |
|---|---|---|
| CN | 104417478 A | 3/2015 |
| JP | 2011-51513 A | 3/2011 |

*Primary Examiner* — Paul N Dickson
*Assistant Examiner* — Timothy Wilhelm
(74) *Attorney, Agent, or Firm* — Snyder, Clark, Lesch & Chung, LLP

(57) ABSTRACT

The present disclosure relates to a dashboard protection arrangement, which is adapted to protect an accessory or a piece of equipment located at a central region of a dashboard of a vehicle from a deploying frontal protection airbag. The dashboard protection arrangement comprises a dashboard airbag adapted to deploy along a surface of the dashboard in order to at least partly cover the central region of the dashboard when deployed. The disclosure further relates to a vehicle comprising the dashboard protection arrangement and to a method of deploying a dashboard airbag of a dashboard protection arrangement.

15 Claims, 2 Drawing Sheets

(56) References Cited

U.S. PATENT DOCUMENTS

| | | | | |
|---|---|---|---|---|
| 6,942,242 B2* | 9/2005 | Hawthorn | ............... | B60R 21/16 280/728.2 |
| 7,731,230 B2* | 6/2010 | Fischer | ................ | B60R 21/205 280/728.1 |
| 8,038,169 B2* | 10/2011 | Rick | ................ | B60R 21/206 280/732 |
| 8,882,138 B1* | 11/2014 | Hicken | ................ | B60R 21/231 280/730.1 |
| 9,150,186 B1* | 10/2015 | Belwafa | ................ | B60R 21/233 |
| 9,227,587 B1* | 1/2016 | Belwafa | ................ | B60R 21/205 |
| 9,272,684 B1* | 3/2016 | Keyser | ................ | B60R 21/237 |
| 9,340,176 B2* | 5/2016 | Belwafa | ................ | B60R 21/233 |
| 9,446,735 B1* | 9/2016 | Jayasuriya | ............ | B60R 21/232 |
| 9,550,469 B2* | 1/2017 | Sato | ................ | B60R 21/233 |
| 9,566,929 B1* | 2/2017 | Belwafa | ................ | B60R 21/205 |
| 9,580,039 B2* | 2/2017 | Schneider | ............ | B60R 21/233 |
| 9,731,677 B1* | 8/2017 | Belwafa | ................ | B60R 21/233 |
| 9,758,121 B2* | 9/2017 | Paxton | ................ | B60R 21/205 |
| 9,796,354 B1* | 10/2017 | Hayashi | ............... | B60R 21/239 |
| 10,011,243 B2* | 7/2018 | Patel | ................ | B60R 21/233 |
| 10,040,416 B2* | 8/2018 | Fukawatase | .......... | B60R 21/231 |
| 10,059,299 B2* | 8/2018 | Yamada | ............... | B60R 21/205 |
| 2015/0166002 A1* | 6/2015 | Fukawatase | .......... | B60R 21/233 280/730.1 |
| 2015/0175116 A1* | 6/2015 | Cho | ................ | B60R 21/205 280/729 |
| 2015/0343986 A1* | 12/2015 | Schneider | ............ | B60R 21/205 280/729 |
| 2015/0367802 A1* | 12/2015 | Fukawatase | .......... | B60R 21/205 280/732 |
| 2016/0159312 A1* | 6/2016 | Sato | ................ | B60R 21/233 280/729 |
| 2017/0369019 A1* | 12/2017 | Jeong | ................ | B60R 21/2346 |
| 2018/0029557 A1* | 2/2018 | Yamada | ............... | B60R 21/2338 |
| 2018/0154856 A1* | 6/2018 | Yamada | ................ | B60R 21/231 |

* cited by examiner

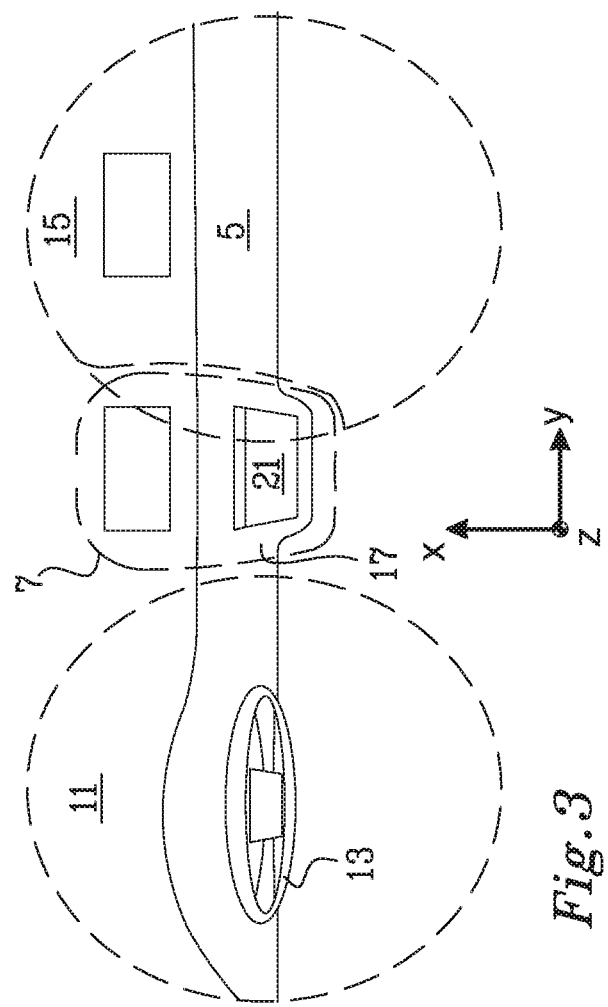
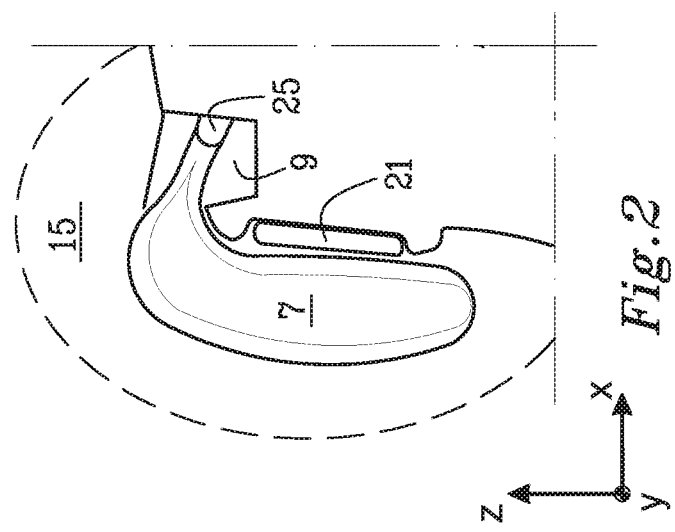
Fig.2
Fig.3

DASHBOARD PROTECTION ARRANGEMENT

RELATED APPLICATION

This application claims priority under 35 U.S.C. § 119 based on European Patent Application No. 16162237.8, filed Mar. 24, 2016, the disclosure of which is hereby incorporated by reference herein.

TECHNICAL FIELD

The present disclosure relates to a dashboard protection arrangement comprising a dashboard airbag. The disclosure further relates to a vehicle comprising the dashboard protection arrangement and to a method of deploying a dashboard airbag of a dashboard protection arrangement.

BACKGROUND

It is well known to utilize one or more deployable airbags in a vehicle in order to protect one or more occupants of the vehicle in case of a collision. A frontal protection airbag for a driver of the vehicle may e.g. be located in a driving wheel in order to protect the driver. A frontal protection airbag for a passenger may be located in a portion of a dashboard in front of the front seat passenger in order to protect the front seat passenger.

It is also known to use an additional airbag, which is stored in a position between a driver seat and a passenger front seat. When deployed, the additional airbag may cover the interspace between the driver and the front seat passenger, which may be useful to protect the driver and/or the front seat passenger in case of an oblique crash scenario involving the vehicle. The additional airbag may cooperate with the frontal protection airbag of the driver and/or passenger and may be helpful, if the driver or the front seat passenger e.g. misses or slides off the frontal protection airbag. See for example patent document U.S. Pat. No. 8,882,138 B1.

In modern vehicles, an accessory or a piece of equipment, such as a mobile phone, tablet computer or touchscreen, may be located at the dashboard and/or at a centre console, e.g. comprised in the dashboard, fixedly attached to the dashboard or in a specialized holder, to be within easy reach for the driver and/or the front seat passenger. The accessory or piece of equipment may be substantially flush with the dashboard or may protrude from the dashboard. The piece of equipment may be comprised in an infotainment system of the vehicle, e.g. a touchscreen for controlling the infotainment system.

In a vehicle, which is at least partially automated, the driver can spend some of his/her attention on other tasks than driving, such as using the mobile phone, tablet computer or touchscreen. Therefore, it may be expected, that the use of such accessories or equipment will be even more frequent in vehicles in the future. However, in case of a collision, such an accessory or such a piece of equipment may pose a threat to an occupant of the vehicle, i.e. the driver, the front seat passenger or another passenger, if the accessory or piece of equipment is thrown around in the vehicle compartment and possibly thrown onto the vehicle occupant.

In oblique crash scenarios comprising oblique impact and/or off road scenarios, e.g. according to a proposed new United States New Car Assessment Program (U.S. NCAP) standard with an impact angle of 15 degrees, the occupant of a vehicle according to known technology risks missing or sliding off the frontal protection airbag resulting in a head impact on interior parts at a central region of the dashboard, i.e. a region of the dashboard being located at the dashboard vertically above the centre console and laterally between the driver and the front seat passenger. There may also be a problem with high BrIC values, i.e. Brain Injury Criteria values, due to an initial contact with the frontal protection airbag before sliding off. It has therefore been suggested to use wider and/or larger airbags. However, wider and/or larger airbags introduce other problems, like increasing the risk of accessories or equipment at the dashboard being torn off and thrown away by the deploying airbag.

There is thus a desire to provide an improved protection of the vehicle occupant.

SUMMARY

The object of the present disclosure is to overcome or ameliorate at least one of the disadvantages of the prior art, or to provide a useful alternative.

The object above may be achieved by the subject-matter of claim 1. Embodiments are set forth in the appended dependent claims, in the following description and in the drawings.

Thus, in a first aspect of the present invention there is provided a dashboard protection arrangement, which is adapted to protect an accessory or a piece of equipment located at a central region of a dashboard of a vehicle from a deploying frontal protection airbag. The dashboard protection arrangement comprises a dashboard airbag adapted to deploy along a surface of the dashboard in order to at least partly cover the central region of the dashboard when deployed.

The central region of the dashboard is located at the dashboard vertically above a centre console, i.e. as seen in a vertical direction of the vehicle, and laterally, i.e. as seen in a lateral direction of the vehicle, between the driver and the front seat passenger.

The longitudinal, lateral and vertical directions as used herein are related to the vehicle. The longitudinal direction of the vehicle coincides with a normal driving direction of the vehicle. The longitudinal direction of the vehicle goes from a front end of the vehicle to a back end of the vehicle. The lateral direction of the vehicle goes from one side of the vehicle to the other side of the vehicle. The vertical direction of the vehicle goes from the floor of the vehicle to the roof of the vehicle. Hence the longitudinal direction, the lateral direction and the vertical direction are perpendicular to each other.

The longitudinal, lateral and vertical directions are also used herein to describe the dashboard airbag. It is then assumed that the directions relate to the dashboard airbag as mounted in a vehicle. However, the dashboard protection arrangement may also be manufactured and sold as a separate unit. It may then during e.g. transport or storage assume another orientation than when mounted in the vehicle.

If the vehicle comprises both the frontal protection airbag for the driver and the frontal protection airbag for the front seat passenger mentioned above, the dashboard airbag may be located between the two frontal protection airbags as seen in the lateral direction.

As mentioned above, the dashboard airbag is adapted to be deployed along the surface of the dashboard, such that the dashboard airbag at least partly, preferably completely or substantially completely, may cover the above-mentioned accessory or piece of equipment at the dashboard, such as the mobile phone, tablet computer or touchscreen.

The dashboard airbag may be located above the accessory or piece of equipment and be adapted to deploy substantially vertically downwards, i.e. towards the floor of the vehicle. Alternatively, the dashboard airbag may be located below the accessory or piece of equipment and be adapted to deploy substantially vertically upwards, i.e. towards the ceiling of the vehicle. As yet an alternative, the dashboard airbag may be adapted to deploy substantially in the lateral direction, i.e. sideways, along the surface of the dashboard. The dashboard airbag may also be adapted to deploy in an oblique angle. There are various means for controlling the direction of deployment known to the skilled person, e.g. shape of the dashboard airbag, packing of the dashboard airbag when not in use, internal tethers, external tethers etc.

The dashboard protection arrangement as disclosed herein may be located in a partially automated, semi-automated or fully automated vehicle. In a partially automated vehicle or a semi-automated vehicle, a driver of the vehicle performs some of the driving functions, while the vehicle autonomously performs other functions. If the vehicle is fully automated, the vehicle autonomously performs the driving functions, at least for a temporary period of time. A vehicle may be arranged to be able to change between driving manually, partially automated, semi-automated and/or fully automated.

The dashboard airbag may have a larger extension in the vertical direction when deployed than in the longitudinal direction, the vertical and longitudinal directions being related to the vehicle. The dashboard airbag may have a larger extension in the lateral direction when deployed than in the longitudinal direction, the lateral and longitudinal directions being related to the vehicle. The dashboard airbag may have a larger extension in both the lateral direction and the vertical direction when deployed than in the longitudinal direction. Thereby the dashboard airbag extends less in the direction towards the driver and the front seat passenger than in one or more directions along the surface of the dashboard. This is suitable since the dashboard airbag is intended to at least partly cover the central region of the dashboard when deployed. When deployed, a surface of the dashboard airbag facing the dashboard preferably may follow the surface of the dashboard.

The dashboard airbag may have a deployment volume in the range of from 5 litres to 50 litres, preferably in the range of from 10 litres to 30 litres. Hence, the dashboard airbag has a relatively small deployment volume and is typically much smaller than any one of the frontal protection airbags, e.g. half the size or less. Purely as an example, the frontal protection airbag for the front seat passenger may typically have a deployment volume in the range of from 100 litres to 130 litres.

The dashboard airbag may comprise a dense and/or coated cloth material, such that it is able to retain its deployment gas for a longer time than the frontal protection airbag. Such cloth materials are e.g. known from e.g. inflatable curtains or knee airbags. The dashboard airbag may be configured without ventilation holes. Seams of the dashboard airbag may be sealed, e.g. with silicon.

The dashboard protection arrangement may further comprise the dashboard, wherein the dashboard airbag is located in the central region of the dashboard.

The dashboard airbag may be stored in a compartment comprised in the dashboard, when not in use, e.g. in a similar way as the frontal protection airbag for the front seat passenger.

The dashboard airbag may have its own inflator. Thereby the deployment of the dashboard airbag may be initiated before the deployment of the frontal protection airbag/s. Hence, the dashboard airbag may assume its deployed state and deployed position before the frontal protection airbag assumes its deployed state and position.

The dashboard protection may comprise a frontal protection airbag, wherein the dashboard airbag is located laterally displaced in relation to the frontal protection airbag before deployment. As mentioned above, there may be a frontal protection airbag for the driver and/or a frontal protection airbag for the front seat passenger. If the vehicle comprises both the frontal protection airbag for the driver and the frontal protection airbag for the front seat passenger, the dashboard airbag may be located between the two frontal protection airbags.

The dashboard airbag may be at least partly located between the dashboard and any one of the frontal protection airbag after deployment. There may e.g. be a partial overlap between the dashboard airbag and any one of the frontal protection airbag of the driver and/or the frontal protection airbag of the front seat passenger.

The dashboard airbag may be adapted to obtain full or substantially full deployment before the frontal protection airbag. Purely as an example, the dashboard airbag may be adapted to obtain full or substantially full deployment in the range of from 2 ms to 20 ms before the frontal protection airbag, preferably in the range of from 5 ms to 15 ms before the frontal protection airbag.

The deployed dashboard airbag may follow the dashboard and may be located between the frontal protection airbag and the accessory or piece of equipment in the deployed state of the airbags. Hence, the accessory or piece of equipment will be at least partly covered by the dashboard airbag when the deploying frontal protection airbag approaches the central region of the dashboard, thereby preventing the frontal protection airbag from throwing the accessory or piece of equipment away, e.g. rearwards into a vehicle compartment and onto a vehicle occupant. The frontal protection airbag of the front seat passenger and/or the frontal protection airbag of the driver may interfere with the dashboard airbag, but the dashboard airbag is then able to protect the accessory or piece of equipment in the way described herein.

Since the dashboard airbag as described herein helps to protect the accessory or piece of equipment from the deploying frontal protection airbag, there is a larger freedom when configuring equipment and accessories for the vehicle, e.g. for the infotainment system of the vehicle. It will for example be possible to use a large and/or protruding screen and yet protect it from the deploying frontal protection airbag.

Further, in case the head of the driver or the front seat passenger would miss or slide off the frontal protection airbag, e.g. due to an oblique impact, the dashboard airbag will be able to help catch the head before it reaches the central region of the dashboard, thereby reduce, or preferably avoid, the risk that the head impacts with stiff interior surfaces.

The invention is also related to a vehicle comprising the dashboard protection arrangement as described herein.

The invention is further related to method of deploying a dashboard airbag of a dashboard protection arrangement as described herein. The method comprises deploying the dashboard airbag along a surface of the dashboard of the vehicle in order to cover at least the central region of the dashboard.

In case the vehicle further comprises a frontal protection airbag, the method may comprise deploying the dashboard airbag such that it obtains full or substantially full deployment before the frontal protection airbag. As mentioned above, the dashboard airbag may be adapted to obtain full or substantially full deployment in the range of from 2 ms to 20 ms before the frontal protection airbag, preferably in the range of from 5 ms to 15 ms before the frontal protection airbag.

The method may comprise deploying the dashboard airbag and the frontal protection airbag, such that the dashboard airbag is at least partly located between the dashboard and the frontal protection airbag after deployment, e.g. with a partial overlap.

The method may comprise retaining full or substantially full deployment of the dashboard airbag for a longer time period than the frontal protection airbag. Purely as an example, the dashboard airbag may retain full or substantially full deployment for at least 1 second longer time or at least a few seconds longer time. The dashboard airbag may retain full or substantially full deployment for a time period of several minutes, e.g. depending on the chosen cloth material.

BRIEF DESCRIPTION OF THE DRAWINGS

The present invention will hereinafter be further explained by means of non-limiting examples with reference to the appended drawings wherein:

FIG. 2 is a cross-sectional view of the dashboard protection arrangement of FIG. 1 with deployed airbags, when seen in a lateral direction of the vehicle.

FIG. 3 schematically illustrates the dashboard protection arrangement of FIG. 1 with deployed airbags, when seen from above.

Figure 1:
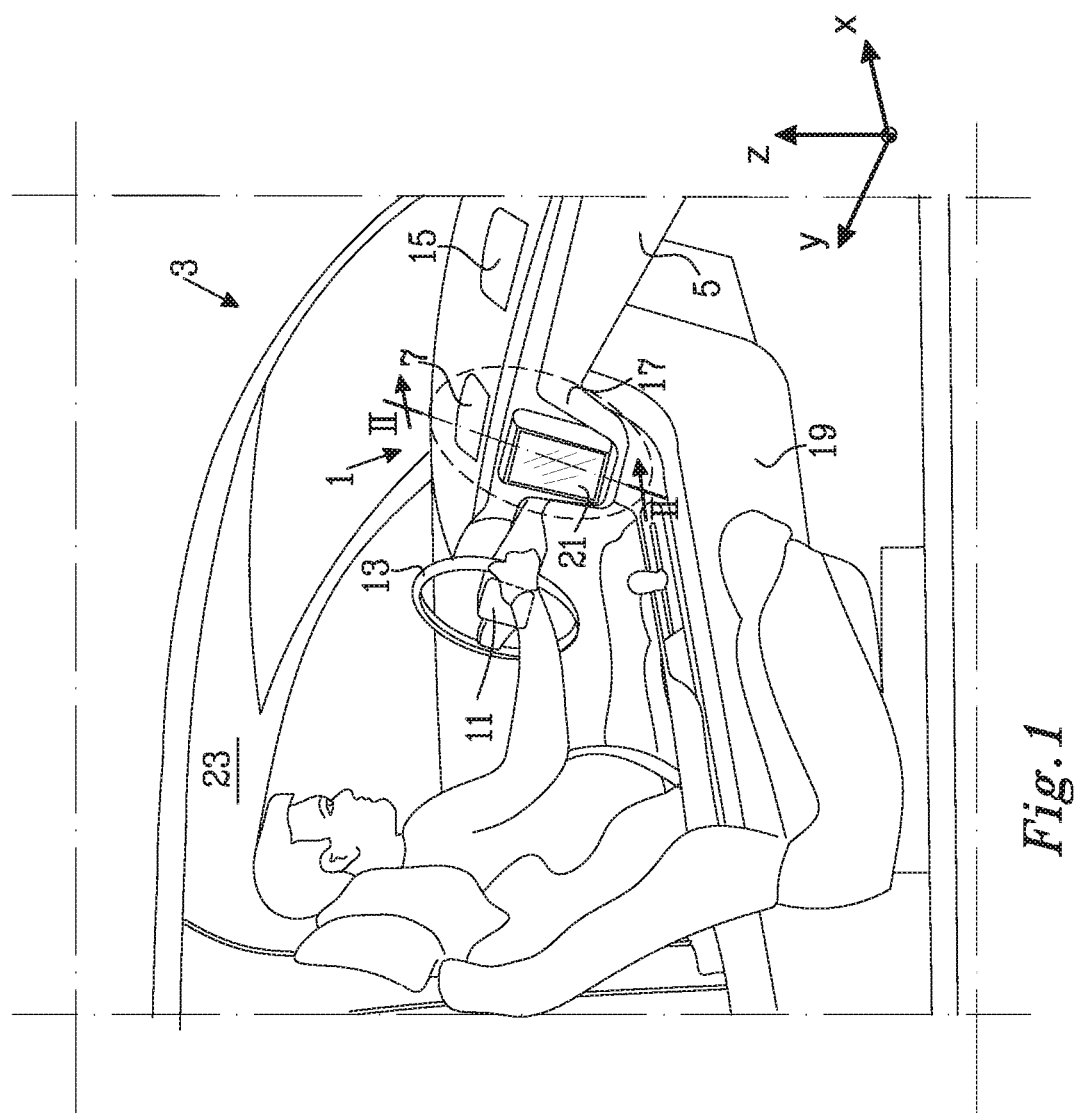
FIG. 1 illustrates a vehicle with a dashboard protection arrangement according to the invention.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

FIG. 1 illustrates a perspective view of a dashboard protection arrangement 1 according to the invention arranged in a vehicle 3 comprising a dashboard 5. FIG. 2 illustrates a cross-sectional view of the dashboard protection arrangement 1, when seen in a lateral direction y of the vehicle 3. FIG. 3 schematically illustrates the dashboard protection arrangement 1 seen from above with a roof of the vehicle 3 being removed for illustrative purposes. FIG. 1 illustrates the airbags, which are further described below, when not in use. FIGS. 2 and 3 show the airbags in a deployed state.

The dashboard protection arrangement 1 comprises a dashboard airbag 7, which is stored in a compartment 9 in the dashboard 5, when not in use.

The dashboard protection arrangement 1 may further comprise at least one frontal protection airbag. In the illustrated embodiment, there is a frontal protection airbag 11 for a driver of the vehicle, e.g. located in a driving wheel 13, and a frontal protection airbag 15 for a front seat passenger, which is located in a portion of the dashboard 5 being located in front of the front passenger seat.

Directions x, y and z are related to the vehicle 3. The longitudinal direction x of the vehicle 3 coincides with a normal driving direction of the vehicle 3. The longitudinal direction x of the vehicle 3 goes from a front end of the vehicle 3 to a back end of the vehicle 3. The lateral direction y of the vehicle 3 goes from one side of the vehicle 3 to the other side of the vehicle 3. The vertical direction z of the vehicle 3 goes from the floor of the vehicle 3 to the roof of the vehicle 3. Hence the longitudinal direction x, the lateral direction y and the vertical direction z are perpendicular to each other.

FIGS. 2 and 3 illustrate the dashboard airbag 7 and the frontal protection airbags 11, 15 in a deployed state. The dashboard airbag 7 is located in a central region 17 of the dashboard 5, i.e. a region of the dashboard 5 being located at the dashboard 5 vertically, i.e. as seen in the vertical direction z of the vehicle 3, above a centre console 19 and laterally, i.e. as seen in the lateral direction y of the vehicle 3, between the driver and the front seat passenger. Hence, in the illustrated embodiment, the dashboard airbag 7 is located between the frontal protection airbag 11 of the driver and the frontal protection airbag 15 of the front seat passenger when deployed, which is best seen in FIG. 3. There may be a partial overlap between the dashboard airbag 7 and the frontal protection airbag 15 of the front seat passenger, as in FIG. 3. There may also be a partial overlap between the dashboard airbag 7 and the frontal protection airbag 11 of the driver, not illustrated.

In a modern vehicle, an accessory or a piece of equipment, such as a mobile phone, tablet computer or touchscreen, may be located at the dashboard 5 and/or at the centre console 19, e.g. comprised in the dashboard 5, fixedly attached to the dashboard 5 or in a specialized holder, to be within easy reach for the driver and/or the front seat passenger. In the illustrated example of FIGS. 1-3, there is a touchscreen 21 attached to the dashboard 5. The accessory or piece of equipment may be substantially flush with the dashboard 5 or may protrude from the dashboard 5. The piece of equipment may be comprised in an infotainment system of the vehicle, e.g. a touchscreen for controlling the infotainment system.

As is best viewed in FIG. 2, the dashboard airbag 7 is deployed along a surface of the dashboard 5. In the illustrated embodiment, the dashboard airbag 7 is deployed substantially vertically downwards, i.e. towards the floor of the vehicle 3. Thereby the dashboard airbag 7 at least partly, preferably completely or substantially completely, covers the accessory or piece of equipment at the dashboard 5. In the illustrated embodiment, the dashboard airbag 7 covers the touchscreen 21. The dashboard airbag 7 is configured to be deployed quickly, such that the dashboard airbag 7 assumes its deployed state and deployed position before the frontal protection airbag 11, 15 assumes its deployed state and position.

The deployed dashboard airbag 7 follows the surface of the dashboard 5 and is thus located between the frontal protection airbag 15 of the front seat and the accessory or piece of equipment, here the touchscreen 21. Hence, the accessory or piece of equipment, such as the illustrated touchscreen 21, is at least partly covered by the dashboard airbag 7 when the frontal protection airbag 15 approaches the central region 17 of the dashboard 5, thereby preventing the frontal protection airbag 15 from throwing the accessory or piece of equipment away, e.g. rearwards into a vehicle compartment 23 and onto a vehicle occupant. Even if FIG. 3 only illustrates that only the frontal protection airbag 15 of the front seat passenger interferes with the dashboard airbag 7, the frontal protection airbag 11 of the driver may as well interfere with the dashboard airbag 7, but the dashboard airbag 7 is then able to protect the accessory or piece of equipment in a corresponding way.

The dashboard airbag 7 as described herein helps to protect the accessory or piece of equipment from the deploying frontal protection airbag 11, 15. Hence, the provision of the dashboard airbag 7 as described herein gives a larger freedom when configuring equipment and accessories for the vehicle. It will for example be possible to use a large and/or protruding screen and yet protect it from the deploying frontal protection airbag 11, 15.

Further, in case the head of the driver or the front seat passenger would miss or slide off the frontal protection airbag 11, 15, e.g. due to an oblique impact, the dashboard airbag 7 will be able to help catching the head before it reaches the central region 17 of the dashboard 5, thereby reducing, or preferably avoiding, the risk that the head impacts with stiff interior surfaces.

The dashboard airbag 7 has a relatively small deployment volume and is much smaller than any one of the frontal protection airbags 11, 15. The dashboard airbag 7 may have a deployment volume in the range of from 5 litres to 50 litres, preferably in the range of from 10 litres to 30 litres. Hence, the dashboard airbag 5 has a relatively small deployment volume and is typically much smaller than any one of the frontal protection airbags 11, 15, e.g. half the size or less. Purely as an example, the frontal protection airbag 15 for the front seat passenger may typically have a deployment volume in the range of from 100 litres to 130 litres.

The dashboard airbag 7 has its own inflator 25. Thereby the deployment of the dashboard airbag 7 may be initiated before the deployment of the frontal protection airbag 11, 15.

The dashboard airbag 7 has a larger extension in the vertical direction z when deployed than in the longitudinal direction x. Further, the dashboard airbag 7 has a larger extension in the lateral direction y when deployed than in the longitudinal direction x. Thereby the dashboard airbag 7 extends less in the direction towards the driver and the front seat passenger than in directions along the surface of the dashboard 5.

Preferably the dashboard airbag 7 is made of a dense and/or coated cloth material, such that it is able to retain its deployment gas for a longer time than the frontal protection airbag 11, 15. Such cloth materials are e.g. known from e.g. inflatable curtains or knee airbags. The dashboard airbag may be configured without ventilation holes. Seams of the dashboard airbag may be sealed, e.g. with silicon.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A dashboard protection arrangement, which is adapted to protect an accessory or a piece of equipment located at a central region of a dashboard of a vehicle from a deploying frontal protection airbag, said dashboard protection arrangement comprises:

a dashboard airbag adapted to deploy along a surface of said dashboard in order to at least partly cover said central region of said dashboard when deployed, and wherein said dashboard airbag has a larger extension in a lateral direction (y) when deployed than in a longitudinal direction (x), said lateral (y) and longitudinal (x) directions being related to said vehicle, and said dashboard airbag is stored in a compartment in said central region of said dashboard when not in use; and at least one frontal protection airbag, wherein said dashboard airbag is located laterally displaced in relation to said frontal protection airbag before deployment, and wherein said dashboard airbag is at least partly located between said dashboard and said frontal protection airbag after deployment.

2. The dashboard protection arrangement according to claim 1, wherein said dashboard airbag has a larger extension in a vertical direction (z) when deployed than in a longitudinal direction (x), said vertical (z) and longitudinal (x) directions being related to said vehicle.

3. The dashboard protection arrangement according to claim 1, wherein said dashboard airbag is adapted to deploy along the surface of said dashboard in order to completely cover said central region of said dashboard when deployed.

4. The dashboard protection arrangement according to claim 1, wherein said dashboard airbag has a deployment volume in the range of from 5 litres to 50 litres.

5. The dashboard protection arrangement according to claim 1, wherein said dashboard airbag comprises a dense and/or coated cloth material.

6. The dashboard protection arrangement according to claim 1, further comprising said central region of said dashboard.

7. The dashboard protection arrangement according to claim 1, wherein there is a partial overlap between said dashboard airbag and said frontal protection airbag after deployment.

8. The dashboard protection arrangement according to claim 7, wherein said partial overlap is in the longitudinal direction of the vehicle.

9. The dashboard protection arrangement according to claim 7, wherein said dashboard airbag is adapted to obtain full or substantially full deployment before said frontal protection airbag.

10. A dashboard protection arrangement according to claim 1 comprising said vehicle.

11. The dashboard protection arrangement according to claim 1, wherein said dashboard airbag has a deployment volume in the range of from 10 litres to 30 litres.

12. A method of deploying a dashboard airbag of a dashboard protection arrangement, said method comprising deploying said dashboard airbag along a surface of a dashboard of a vehicle, wherein said dashboard airbag has a larger extension in a lateral direction (y) when deployed than in a longitudinal direction (x), said lateral (y) and longitudinal (x) directions being related to said vehicle, and said vehicle comprising a frontal protection airbag, wherein when deployed, said dashboard airbag covers an accessory or a piece of equipment located at a central region of said dashboard, and deploying said frontal protection airbag, such that said dashboard airbag is at least partly located between said dashboard and said frontal protection airbag after deployment, and said dashboard airbag is stored in a compartment in said central region of said dashboard when not in use.

13. The method according to claim 12, wherein said method comprising deploying said dashboard airbag such that it obtains full or substantially full deployment before said frontal protection airbag.

14. The method according to claim 13, wherein said method comprises retaining full or substantially full deployment of said dashboard airbag for a longer time period than said frontal protection airbag.

15. The method according to claim 12, wherein there is a partial overlap between said dashboard airbag and said frontal protection airbag after deployment.

\* \* \* \* \*